(12) United States Patent
Engbrecht

(10) Patent No.: US 6,865,510 B2
(45) Date of Patent: Mar. 8, 2005

(54) ADAPTIVE ASYMMETRIC NETWORK CONNECTIVITY PROBING SYSTEM AND METHOD

(75) Inventor: Michael R. Engbrecht, Mahtomedi, MN (US)

(73) Assignee: UGS Corp., Plano, TX (US)

(*) Notice: Subject to any disclaimer, the term of this patent is extended or adjusted under 35 U.S.C. 154(b) by 86 days.

(21) Appl. No.: 10/318,291

(22) Filed: Dec. 12, 2002

(65) Prior Publication Data

US 2004/0117149 A1 Jun. 17, 2004

(51) Int. Cl.[7] .................................................. G06F 11/30
(52) U.S. Cl. ......................... 702/182; 702/186; 702/188
(58) Field of Search ........................... 707/201; 702/179, 702/180, 182–183, 186–188; 709/203, 224; 375/222, 231; 370/484

(56) References Cited

U.S. PATENT DOCUMENTS

| | | | |
|---|---|---|---|
| 6,058,102 A | | 5/2000 | Drysdale et al. |
| 6,725,176 B1 | * | 4/2004 | Long et al. .................. 702/183 |
| 2001/0051955 A1 | * | 12/2001 | Wong .......................... 707/201 |

FOREIGN PATENT DOCUMENTS

EP  1 026 855 A2  8/2000

OTHER PUBLICATIONS

Kevin Lai et al., "Measuring Link Bandwidths Using A Deterministic Model of Packet Delay", Computer Communication Review, Association for Computing Machinery, New York, U.S., vol. 30, No. 4, Oct. 2000, pp. 283–294.
D. D. Luong et al., "Hop–By–Hop Versus End–To–End Active Measurements", Computer Communications, Elsevier Science Publishers BV, Amsterdam, NL, vol. 25, No. 10, Jun. 15, 2002. pp. 954–963.
G. Almes et al., "RFC 2679: A One–Way Delay Metric for IPPM", Network Working Group, Sep. 1999.

* cited by examiner

*Primary Examiner*—Bryan Bui

(57) ABSTRACT

A system and method for analyzing network traffic between a client system and multiple mirror systems, to determine the most efficient data transfer paths for accessing the mirrored data. Accordingly, a set of network probes are passed between network point pairs. After doing so, the resulting figures are analyzed using a first-order linear equation to determine which pairs are "closest" in terms of data transfer efficiency in a specific direction. Using the closeness results, the optimal data paths for large data transfer are determined.

16 Claims, 4 Drawing Sheets

ADAPTIVE ASYMMETRIC NETWORK CONNECTIVITY PROBING SYSTEM AND METHOD

TECHNICAL FIELD OF THE INVENTION

The present invention is directed, in general, to improved data transfer in a communications network and, more specifically, to a system and method for determining and selecting the most efficient path for a data transfer.

BACKGROUND OF THE INVENTION

Due to an increasing reliance on large-volume data transfers, there is an increasing need to accurately measure operational performance of data communications networks. Communications networks, especially packetized data networks, are currently utilized in various applications for transmission and reception of data between parties at different locations. A typical data transmission system includes a plurality of end user sites and a data packet switching network, which resides between the sites to facilitate communications. Each site is connected to the switching network via an access channel (i.e., a channel connecting a site to a communications system), wherein transmission circuits, preferably virtual circuits, establish paths between the sites through the access channel and the switching network.

Packetized data networks typically format data into packets for transmission from one site to another. In particular, the data is partitioned into separate packets at a transmission site, wherein the packets usually include headers containing information relating to packet data and routing. The packets are transmitted to a destination site in accordance with any of several conventional data transmission protocols known in the art (e.g., Asynchronous Transfer Mode (ATM), Frame Relay, High Level Data Link Control (HDLC), X.25, IP tunneling, etc.), by which the transmitted data is restored from the packets received at the destination site.

Packetized data communications are especially appealing for common carrier or time-shared switching systems, since a packet transmission path or circuit is unavailable only during the time when a packet utilizes the circuit for transmission to the destination site, thereby permitting other users to utilize that same circuit when the circuit becomes available (i.e., during intervening periods between packet transmissions). The access channel and each individual transmission circuit typically have a maximum data carrying capacity or bandwidth that is shared among the various users of the network. The access channel utilization is typically measured as an aggregate of the individual circuit utilizations and has a fixed bandwidth, while the individual circuits may be utilized by several users wherein each user may utilize an allocated portion of the circuit.

Various systems have been proposed which provide some measure of network system performance. Specifically, a number of techniques for measuring round trip delay (RTD) of data transmitted between two sites is known. For example, U.S. Pat. No. 5,521,907 to Ennis, Jr. et al., the disclosure of which is incorporated herein by reference in its entirety, discloses a system for passively measuring the round trip delay of data messages sent between two sites. More specifically, a console triggers probes at two sites to store data packets being sent between the two sites. The probes generate unique packet signatures based on the data in the packets, and time stamp the signatures. By matching signatures from the two probes and comparing the corresponding timestamp values, the console can determine the round trip delay between the sites. This technique requires the storage, transmission and processing of a significant amount of data, particularly if implemented to periodically monitor all virtual circuits existing between a set of sites. That is, the passive probes cannot individually determine round trip delay, and each probe must store and transmit a substantial amount of data to the console which is required to correlate signature and timestamp data from different sites.

U.S. Pat. No. 5,450,394 to Gruber et al., the disclosure of which is incorporated herein by reference in its entirety, discloses a technique for determining round trip delay in which measurement cells containing timestamp information are sent between two nodes. A first node transmits a measurement cell with a first time stamp to a second node, and the second node replies with a measurement cell containing additional time stamp information which can be used by the first node to determine the round trip delay. Because the technique relies, in part, on timestamps already present in PM OAM (performance management operations, administration and maintenance) ATM cells, the technique is specific to the ATM protocol and cannot readily be adapted to other data protocols or be expanded to monitor other service level performance metrics. Further, the technique does not allow both nodes to measure the round trip delay of the same sequence of cells (i.e., either only one of the two nodes measures round trip delay or the two node measure delays of different transmitted cell sequences).

Further, while it is possible for individual switches in existing network systems to indicate how many packets of data have been dropped by the switch, there are no known systems capable of measuring a rate of successful (or unsuccessful) data delivery on a service level, e.g., over a particular virtual circuit or to a particular end user.

The problem of providing service level analysis of network performance is complicated by the fact that many switching networks comprise interworked systems using plural, different data transmission protocols (e.g., an ATM switching network interworked with a Frame Relay switching network), thereby forming a so-called "interworked" network. Such interworked networks are becoming more common, and present an additional challenge to designing a service level analysis tool that employs a standard message structure and messaging protocol useful for communicating between any two sites. Existing systems relying on inter-site or inter-probe messages to assess system performance are generally incapable of operating across interworked networks.

Current performance monitoring techniques involve the use of 'ping', 'traceroute', 'netperf', data accessed through SNMP, etc. These methods are disadvantageous in that they add extra traffic load in the network between all of the access points. These methods also add additional packet processing on the network routers. These traditional network performance measurement mechanisms tend to be relatively heavy weight and generally rely on sending a continuous sequence of ping packets or other network probes between an end-point to all the other end-points. This process creates a large increased load on the network. The traditional normally high overhead network performance measurement mechanisms are herein referred to as 'heavy weight' mechanisms.

A typical ISP or a corporate intranet backbone has a very large number of network end-points. It is not typical to have a continuous monitoring of network performance between all of the end-points. The problem is compounded by the fact that the access points that may be controlled by the network operator are usually intermediate points in the network, and do not constitute either the source or destination of the traffic.

It is also known that data transfer performance between two points may differ depending on the direction of the data traffic. Where communication in one direction may be relatively efficient, communication in the reverse direction may be inefficient.

Often, identical data is stored or "mirrored" on multiple different systems, all of which are accessible over the same network. If a client system must read from or write to the mirrored data, it is advantageous to have the client system access the mirror system with which it has the most efficient connection. It is possible that one mirror system provides the most efficient data transfer TO the client system, while another mirror system provides the most efficient data transfer FROM the client system.

Accordingly, there remains a need for a system and method for analyzing network traffic between a client system and multiple mirror systems, to determine the most efficient data transfer paths for accessing the mirrored data.

SUMMARY OF THE INVENTION

To address the above-discussed deficiencies of the prior art, it is a primary object of the present invention to provide improved data transfer in a communications network.

It is another object of the present invention to provide a system and method for determining and selecting the most efficient path for a data transfer.

The preferred embodiment provides a system and method for analyzing network traffic between a client system and multiple mirror systems, to determine the most efficient data transfer paths for accessing the mirrored data. According to this embodiment, a set of network probes are passed between network point pairs. After doing so, the resulting figures are analyzed using a first-order linear equation to determine which pairs are "closest" in terms of data transfer efficiency in a specific direction. Using the closeness results, the optimal data paths for large data transfer are determined.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

Definitions: Following are short definitions of the usual meanings of some of the technical terms which are used in the present application. (However, those of ordinary skill will recognize whether the context requires a different meaning.) Additional definitions can be found in the standard technical dictionaries and journals.

latency: The round-trip-delay (RTD) of a network connection for a message of minimum possible size for the connection protocol.

BW: Bandwidth, e.g. measured in kilobits per second.

recv: Abbreviation for "receive"

The preferred embodiment provides a system and method for analyzing network traffic between a client system and multiple mirror systems, to determine the most efficient data transfer paths for accessing the mirrored data. According to this embodiment, a set of network probes are passed between network point pairs. After doing so, the resulting figures are analyzed using a first-order linear equation to determine which pairs are "closest" in terms of data transfer efficiency in a specific direction. Using the closeness results, the optimal data paths for large data transfer are determined.

Many users have the common problem of optimally sharing large bulk data files between many geographically distributed clients. The network connections between widely dispersed clients can easily involve expensive and low-performance wide area networks (WANs).

A significant number of these connections are also asymmetric. Asymmetric, in this context, means that the bandwidth for large file transfer in one direction is noticeably different from the bandwidth for sending the file in the opposite direction.

Bulk data replication supports replication of mirrored computer databases in many different geographical locations. These mirrored systems may not be exact copies of each other; often a database keeps track of the actual "valid" copies of data items among these physical locations. A particular logical data item may exist in one or more of these physical locations. An ancillary mechanism now exists based on event processing to "replicate" these data items, that is, to copy a data item from one physical location to another.

Figure 1:
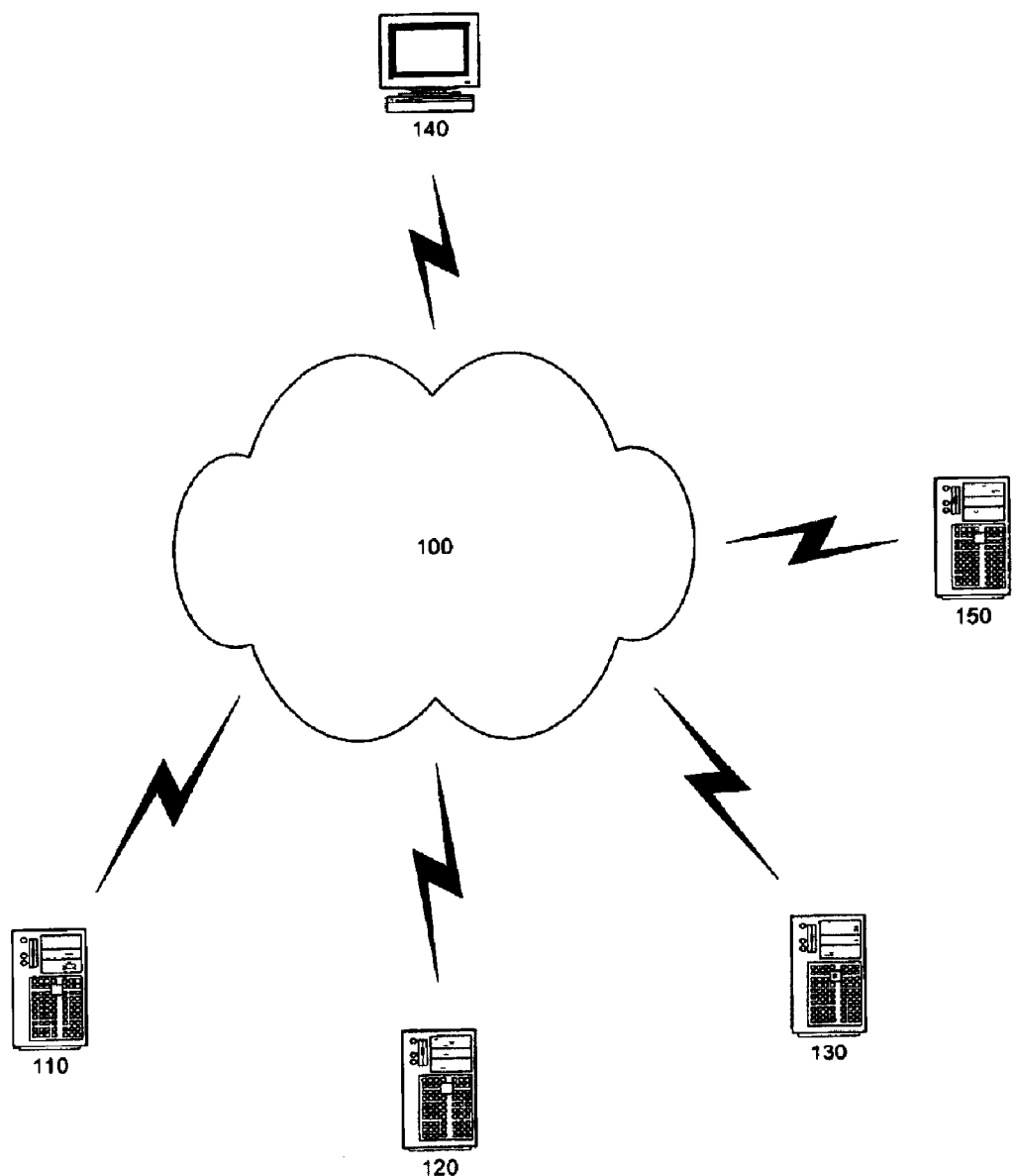
FIG. 1 depicts a high-level diagram of multiple data processing systems, in accordance with a preferred embodiment of the present invention.

For example, FIG. 1 shows mirrored computer systems with equivalent bulk data at different locations, labeled system 110, system 120, and system 130, each connected to communicate with network 100. Also shown is a client system 140 connected to the network 100 at another location. Then the candidate connections that can fulfill the functionality are: '110 to 140', '120 to 140', and '130 to 140'. Further, a control system 150 is running at another independent location is shown.

In this example, the operative connection parameter can be 'send bandwidth' to client system 140 for any data stored on system 110, system 120, or system 130. Alternatively, the operative connection parameter can be 'receive bandwidth' from system 110, system 120, or system 130 to client system 140. The near-optimum connection would be the one with the highest operative bandwidth.

In the preferred embodiment, the 'closeness' metrics will always be chosen from the probe origination point of the mirror system locations. Since these locations are typically high availability servers, they will be expected to be more stable, and have better historical metric coverage as compared to the client systems. Such locations also have a better chance of successfully implementing randomizing and load balancing functionality influenced by the connection metrics resulting from this embodiment. In an alternate embodiment, the probe linear regression analysis and comparison logic can be implemented fully from the client side, given that the client is provided a list of equivalent mirror systems for the service of interest.

FIG. 1 also illustrates that the network location for comparing connections can be implemented at a location that is different from any endpoints of the connections being considered. That is, the comparison logic need not be implemented by the client, nor any single mirror system that implements the probe and linear regression logic. Here, method server 150 manages the connection comparisons described below. The network server 150 communicates with the mirror systems 110/120/130 and the client system 140 over network 100 connections to communicate connection characteristic estimates (latencies and bandwidths) and control decisions. Local caching of the distance connection characteristics at the comparison location is desirable to reduce decision latencies. This is because the comparison location may have to be located far from most (or all) of the other systems.

The networks are occasionally sampled with asymmetric test messages or "probes," sent between the mirror systems 110/120/130 and the client system 140. The timings of a trio of test messages sent nearly concurrently are used to solve the first-order linear prediction equation of $$\Delta \hat{t} = (KB_{send} / BW_{send}) + (KB_{recv} / BW_{recv}) + LATENCY$$

for $BW_{send}$, $BW_{recv}$, and LATENCY
where
$\Delta t$ is the expected connection round-trip time as a function of message 'send' and 'recv' kilobytes;
$KB_i$ is message kilobytes in the 'i' direction;
$BW_i$ is available connection bandwidth in the 'i' direction;
Send is a direction to the destination;
Recv is a direction from the destination; and
LATENCY is the connection round-trip delay for a zero-byte message.

It should be noted that each probe message, because it has differing $KB_{send}$ and $Kb_{recv}$, can be regarded as two different, corresponding messages, one in the "send" direction and a corresponding one in the "receive" direction. The messages are asymmetric.

In order to manage the problem of noisy connections, the parameters and results of the trio of probe messages are maintained in a weighted infinite-impulse-response (IIR) filter state. This IIR filter state includes the auto- and cross-correlation statistics. This persistent IIR filter state also satisfies the problem of detecting systematic connection changes. To satisfactorily estimate the values of LATENCY, $BW_{send}$, and $BW_{recv}$, three round-trip sample probes are used:

One with low $KB_{send}$ and low $KB_{recv}$.
One with relatively high $KB_{send}$ and low $Kb_{recv}$, such that $(KB_{send}/BW_{send})$ is relatively higher than LATENCY.
One with relatively high $KB_{recv}$ and low $Kb_{send}$, such that $(KB_{recv}/BW_{recv})$ is relatively higher than LATENCY.

The order of these probes can be arbitrary. Each of these three probes results in a measured time delta. The full set of probe parameters and results, including three sets of measured $\Delta t$, $KB_{send}$, and $KB_{recv}$, are considered a single sample of the state of the connection. The results of past sample state estimates are used for determining the parameters of future probes so as to:

Improve the signal-to-noise ratio in the sampling problem by trying to invoke a response for the larger probes that is higher than the estimated noise from earlier samples;
Satisfy the desire to invoke a response measurably higher than LATENCY for two of the probes; and
Avoid adverse impact on the network as a byproduct of sampling with too large of a probe size.

The context of the probe messages, in the preferred embodiment, is primarily pseudo-random binary data, so as to minimize physical connection reduction due to any hidden bandwidth compression technologies. There will also be a small amount of header, timing, and control information within the messages, e.g., for relative timestamps and probe size control for far connection endpoint logic. It is also possible to recover the time deltas between probes from the other side's endpoints if a consistent timestamp is passed and returned across individual probes. This can add additional pseudo-reverse probes to the sample set.

Weighted IIR filter states for sequences of samples are maintained for the probe kilobyte sizes ('send' and "recv") and measured response times $\Delta t$, as well as their weighted auto- and cross-correlation statistics. The weight of older statistics is reduced per an IIR decay parameter, so the more recent samples dominate the filter states. The full weighted filter states are solved after any given trio of probes to provide estimates of the connection bandwidths and latency. As a byproduct of the state estimation, the observed noise on the connection is estimated and contributes to the decision on what probe sizes to use in the next trio.

The decision to generate a new probe trio and update the IIR state is driven by the age of the last IIR state, along with the need to use the connection characteristics in support of higher functionality. A probe is not generated if the age of the most recent sample is lower than a configured threshold (nor is the connection probed if there is no immediate demand for information about its characteristics). In such a situation, the characteristics from the past solution estimate is used. This implements a local (to the probe source) caching mechanism that also avoids the adverse network impacts of high rates of probing. In cases of extreme connection LATENCY, it may be desirable to always return cached (past) solution estimates, and perform connection probes and state updates asynchronously.

In the preferred embodiment, only the solution characteristics of $BW_{send}$, $BW_{recv}$, LATENCY, linear prediction root-mean-square error and possibly age of the solution are routinely communicated beyond the location of the weighted filter states.

Figure 2:
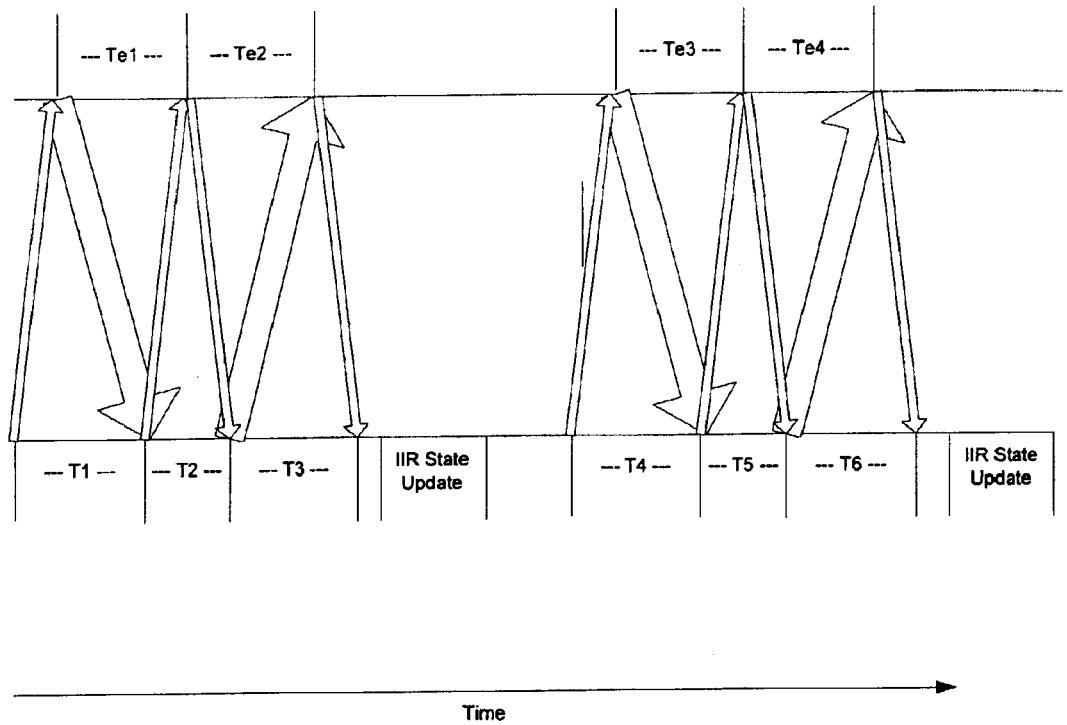
FIG. 2 depicts an exemplary timeline of the logic used to estimate the network characteristics of a single connection, in accordance with a preferred embodiment of the present invention.

FIG. 2 illustrates the timeline of the logic used to estimate the network characteristics of a single connection. Some probe design adjustment is allowed between individual probes in addition to the pre-probe design that is illustrated. For example: Following the very first IIR state update and linear regression solution (after the time interval T3 in FIG. 2), there exists a first estimate of the connection 'recv' bandwidth and its latency. This information is useful in designing the size of the larger kilobytes received ($KB_{recv}$) for the next probe (shown from beginning of time interval Te3 to end of time interval T4 in FIG. 2) so to minimize the probe size, yet still induce a measurable bandwidth-driven time delay over and above the connection latency. Additionally, following the second and subsequent IIR state updates (after the interval T6 in FIG. 2) there exists meaningful root-mean-square error metrics that are indicative of the linear regression solution fit. A relatively high root-mean-square error can be indicative of systemic noise on the solution state and would be one reason to use relatively larger probe sizes in subsequent connection sampling.

The following are the input/output variables used in a network probe in accordance with the preferred embodiment.

Input:
'from' system address and 'to' system address for the connection information Output:
Round-trip (RT) latency, e.g. in units of milliseconds
Send Bandwidth, e.g. in units of kilobits/second
Receive Bandwidth, e.g. in units of kilobits/second
Linear regression root-mean-square error, e.g. in units of milliseconds
Age of the state estimate, e.g. in units of seconds The disclosed functionality/architecture enables various improved operations, such as:

Connection bandwidth load balancing algorithms proportional to the measured available bandwidths, e.g. for bulk data transfers, or any other functionality that can result in significant bandwidth consumption on a connection-by-connection basis Adaptive service provider choices for client demand, e.g. for web services where both bandwidths and latencies are of importance Minimum connection TCP buffer sizing, where both connection bandwidths and latencies are of importance When a client system performs an operation to transfer a file to a mirrored system (or any other operation that consumes significant bandwidth), the file preferably should be transferred to the 'closest' mirror system of the many permissible (and logically equivalent) mirror systems. In the context of file transfer, the overriding metric of concern for 'closeness' is the receive bandwidth from the client ('to') to the various physical locations ('from') that can logically accept the file. Any of the optional locations will suffice to receive the file, but the one with the highest available receive bandwidth will perform best.

For example, if three probes generated t's of 1, 3 and 10, we'd keep

1) 'sum of number of probes'=3
2) 'sum of t' as 14
3) 'sum of t*t' as $(1*1)+(3*3)+(10*10)=110$, and do similarly for all the other sums.

Then on the next probe trio, if t's were 2, 9 and 5, we'd decay the previous values as part of the IIR filtering (e.g. by 0.5) and the updated sums would be 1) 'sum of number of probes'=$(3*0.5)+3=4.5$
2) 'sum of t' is $(14*0.5)+16=23$
3) 'sum of t*t' is $(110*0.5)+(2*2)+(9*9)+(5*5)=165$.

Other sums are filtered similarly.

It should be noted that, after an initial trio of probes, the preferred embodiment doesn't solve each trio of probes independently from past trios of probes and then filter the results. It filters the linear regression parameters, then solves for the results from those updated parameters. This is a more robust design than solving then filtering, which is an alternate embodiment, and is an advantageous way to get good noise information out of the process.

Further, the preferred embodiment provides a means for measuring any delay in the time of receiving the 'send' message and replying with the 'recv' message. There are several computer operating system delays that may make that non-trivial, such as a system that is grossly overloaded, e.g., by swapping. Part of the return 'header' information includes that delay so that the measured delta-T for any given round-trip at the probe logic side can be adjusted down by that round-trip 'dead' time, should it ever happen. This feature recognizes that such a delay between receiving and replying on the far endpoint logic is generally not induced by connection characteristics.

Figure 3:
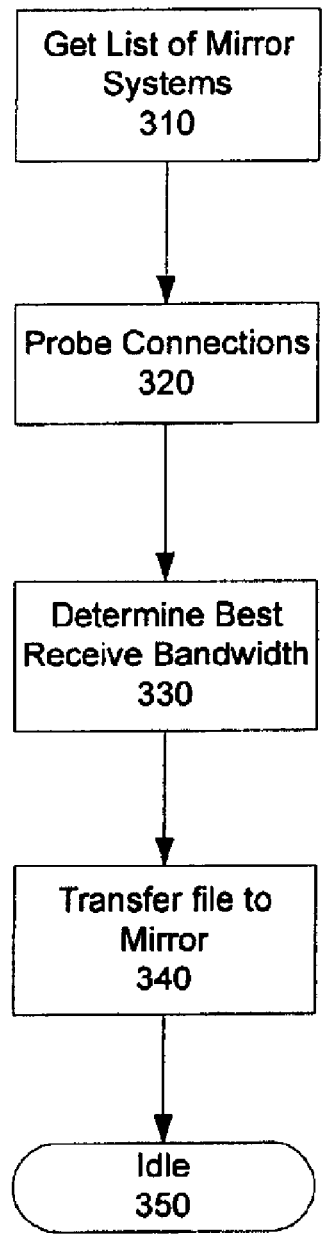
FIG. 3 shows a flowchart of a process to transfer a file from a client to a mirror, in accordance with a preferred embodiment of the present invention.

FIG. 3 shows a flowchart of a process to transfer a file from a client to a mirror, in accordance with a preferred embodiment of the present invention:

Get a list of accessible mirror systems (step 310).

Next, probe the connections (or use recently probed cached results), as described above, to determine the mirror-to-client receive bandwidths for each mirror system (step 320).

From the probe results, choose the mirror system with the highest receive bandwidth as the one to receive the file transfer (step 330).

Finally, transfer file to the chosen mirror system (step 340).

Similarly, when a client system performs an operation to transfer a file from a mirrored system, the file preferably should be transferred from the 'closest' mirror system of the many permissible (and logically equivalent) mirror systems. In the context of file transfer, the overriding metric of concern is the send bandwidth from the mirror system to the client system. Any of the optional locations, provided they in fact have the required file stored, will suffice to transfer the file, but the one with the highest available receive bandwidth will perform best.

Figure 4:
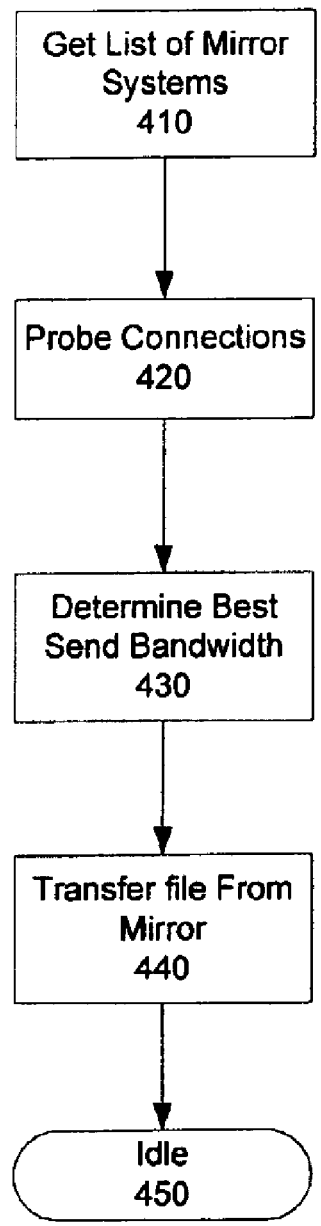
FIG. 4 shows a flowchart of a process to transfer a file from a mirror to a client, in accordance with a preferred embodiment of the present invention.

FIG. 4 shows a flowchart of a process to transfer a file from a client to a mirror, in accordance with a preferred embodiment of the present invention:

Get a list of accessible mirror systems that store copies of the required file (step 410).

Next, probe the connections (or use recently probed cached results), as described above, to determine the mirror-to-client send bandwidths for each mirror system (step 420).

From the probe results, choose the mirror system with the highest transfer bandwidth as the one to transfer the file (step 430).

Finally, transfer file from the chosen mirror system to the client (step 440).

Those skilled in the art will recognize that, for simplicity and clarity, the full structure and operation of all data processing systems suitable for use with the present invention is not being depicted or described herein. Instead, only so much of a data processing system as is unique to the present invention or necessary for an understanding of the present invention is depicted and described. The remainder of the construction and operation of data processing system 100 may conform to any of the various current implementations and practices known in the art.

It is important to note that while the present invention has been described in the context of a fully functional system, those skilled in the art will appreciate that at least portions of the mechanism of the present invention are capable of being distributed in the form of a instructions contained within a machine usable medium in any of a variety of forms, and that the present invention applies equally regardless of the particular type of instruction or signal bearing medium utilized to actually carry out the distribution. Examples of machine usable mediums include: nonvolatile, hard-coded type mediums such as read only memories (ROMs) or erasable, electrically programmable read only memories (EEPROMs), user-recordable type mediums such as floppy disks, hard disk drives and compact disk read only memories (CD-ROMs) or digital versatile disks (DVDs), and transmission type mediums such as digital and analog communication links.

Although an exemplary embodiment of the present invention has been described in detail, those skilled in the art will understand that various changes, substitutions, variations, and improvements of the invention disclosed herein may be made without departing from the spirit and scope of the invention in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle. Further, it should be noted that where a claim may indicate multiple actions or steps, the claimed actions or steps do not have to be performed in any particular order unless specifically noted or inherently required.

What is claimed is:

1. A method for measuring efficiency in data communications, comprising:

transmitting at least three outgoing probe message from a first system to a second system, the outgoing probe messages having respective sizes $KB1_{send}$, $KB2_{send}$, and $KB3_{send}$;

receiving incoming probe messages corresponding to the outgoing probe messages, in the first system from the second system, the incoming probe messages having respective sizes $KB1_{recv}$, $KB2_{recv}$, and $KB3_{recv}$, wherein $KB1_{send}$ is approximately equal to $KB1_{recv}$, $KB2_{send}$ is greater than $KB2_{recv}$, $KB3_{send}$ is less than $KB3_{recv}$, and $\Delta t1$, $\Delta t2$, and $\Delta t3$ are the times between when respective first outgoing probe messages are sent and corresponding incoming probe messages are received;

calculating values $\Delta t$, $KB_{send}$ and $KBrecv$ from $KB1_{send}$, $KB2_{send}$, $KB3_{send}$, $KB1_{recv}$, $KB2_{recv}$, $KB3_{recv}$, $\Delta t1$, $\Delta t2$, and $\Delta t3$;

calculating a least-squares-error fit of BWsend, BWrecv and LATENCY to the linear modeling equation of $\Delta t = (KB_{send}/BW_{send}) + (KB_{recv}/BW_{recv}) + LATENCY$, wherein $BW_{send}$ indicates available connection bandwidth from the first system to the second system, $BW_{recv}$ indicates available connection bandwidth from the second system to the first system, and LATENCY is the delay time of a zero-byte message sent from the first system to the second system and back to the first system.

2. The method of claim 1, further comprising maintaining persistent state statistics relating to the first system and second system, by employing IIR filtering to keep the values bounded, to include at least one of the sum of the number of message round-trips, the sum of $\Delta t1$, $\Delta t2$, and $\Delta t3$, the sum of $KB1_{send}$, $KB2_{send}$, and $KB3_{send}$, the sum of $KB1_{recv}$, $KB2_{recv}$, and $KB2_{recv}$, the sum of $\Delta t1^2$, $\Delta t^2$, and $\Delta t3^2$, the sum of $KB1_{send}^2$, $KB2_{send}^2$, and $KB3_{send}^2$, the sum of $KB1_{recv}^2$, $KB2_{recv}^2$, and $KB3_{recv}^2$, the sum of $KB1_{send}*KB1_{recv}$, $KB2_{send}*KB2_{recv}$, and $KB3_{send}*KB3_{recv}$, the sum of $\Delta t1*KB1_{recv}$, $\Delta t2*KB2_{recv}$, and $\Delta t3*KB3_{recv}$, and the sum of $\Delta t1*KB1_{send}$, $\Delta t2*KB2_{send}$, and $\Delta t3*KB3_{send}$.

3. The method of claim 1, wherein all of the probe messages are comprised of pseudo-random binary data.

4. The method of claim 1, wherein $\Delta t$, KBsend and KBrecv are calculated using decayed values from previous values stored in an IIR filter.

5. The method of claim 1, wherein at the second system is one of a set of mirror systems.

6. The method of claim 1, wherein $KB2_{send}$ is adaptively driven such that $KB2_{send}/BW_{send}$ is detectable above LATENCY.

7. The method of claim 1, wherein $KB3_{recv}$ is adaptively driven such that $KB3_{recv}/BW_{recv}$ is detectable above LATENCY.

8. A method for measuring efficiency in data communications, comprising:

loading a set of data, the data including $KB1_{send}$, $KB2_{send}$, and $KB3_{send}$, which represent the respective sizes of a series of probe messages from a first system to a second system, $KB1_{recv}$, $KB2_{recv}$, and $KB3_{recv}$, which represent the respective sizes of a series of probe messages from the second system to the first system, wherein $KB1_{send}$ is approximately equal to $KB1_{recv}$, $KB2_{send}$ is greater than to $KB2_{recv}$, and $KB3_{send}$ is less than $KB3_{recv}$, and $\Delta t1$, $\Delta t2$, and $\Delta t3$, which represent the round-trip times of a series of probe messages sent from the first system to the second system and back to the first system;

calculating values $\Delta t$, KBsend and KBrecv from $KB1_{send}$, $KB2_{send}$, $KB3_{send}$, $KB1_{recv}$, $KB2_{recv}$, $KB3_{recv}$, $\Delta t1$, $\Delta t2$, and $\Delta t3$;

calculating a least-squares-error fit of BWsend, BWrecv and LATENCY to the linear modeling equation of $\Delta t = (KB_{send}/BW_{send}) + (KB_{recv}/BW_{recv}) + LATENCY$, wherein $BW_{send}$ indicates available connection bandwidth from the first system to the second system, $BW_{recv}$ indicates available connection bandwidth from the second system to the first system, and LATENCY is the delay time of a zero-byte message sent from the first system to the second system and back to the first system, and storing $BW_{send}$, $BW_{recv}$, and LATENCY in a computer-readable medium.

9. The method of claim 8, further comprising
maintaining persistent state statistics relating to the first system and second system, by employing IIR filtering to keep the values bounded, to include at least one of
the sum of the number of message round-trips,
the sum of $\Delta t1$, $\Delta t2$, and $\Delta t3$,
the sum of $KB1_{send}$, $KB2_{send}$, and $KB3_{send}$,
the sum of $KB1_{recv}$, $KB2_{recv}$, and $KB2_{recv}$,
the sum of $\Delta t1^2$, $\Delta t2^2$, and $\Delta t3^2$,
the sum of $KB1_{send}^2$, $KB2_{send}^2$, and $KB3_{send}^2$,
the sum of $KB1_{recv}^2$, $KB2_{recv}^2$ and $KB3_{recv}^2$,
the sum of $KB1_{send}*KB1_{recv}$, $KB2_{send}*KB2_{recv}$, and $KB3_{send}*KB3_{recv}$,
the sum of $\Delta t1*KB1_{recv}$, $\Delta t2*KB2_{recv}$, and $\Delta t3*KB3_{recv}$, and
the sum of $\Delta t1*KB1_{send}$, $\Delta t2*KB2_{send}$, and $\Delta t3*KB3_{send}$.

10. The method of claim 8, wherein $\Delta t$, KBsend and KBrecv are calculated using decayed values from previous values stored in an IIR filter.

11. The method of claim 8, wherein $KB2_{send}$ is adaptively driven such that $KB2_{send}/BW_{send}$ is detectable above LATENCY.

12. The method claim 8, wherein $KB3_{recv}$ is adaptively driven such that $KB3_{recv}/BW_{recv}$ is detectable above LATENCY.

13. A computer program product tangibly embodied in a computer-readable medium, comprising:
instructions for loading a set of data, the data including
$KB1_{send}$, $KB2_{send}$, and $KB3_{send}$, which represent the respective sizes of a series of probe messages from a first system to a second system,
$KB1_{recv}$, $KB2_{recv}$, and $KB3_{recv}$, which represent the respective sizes of a series of probe messages from the second system to the first system, wherein $KB1_{send}$ is approximately equal to $KB1_{recv}$, $KB2_{recv}$ is grater than to $KB2_{recv}$, and $KB3_{send}$ is less than $KB3_{recv}$, and
$\Delta t1$, $\Delta t2$, and $\Delta t3$, which represent the round-trip times of a series of probe messages sent from the first system to the second system and back to the first system;
instructions for calculating values $\Delta t$, KBsend and KBrecv from $KB1_{send}$, $KB2_{send}$, $KB3_{send}$, $KB1_{recv}$, $KB2_{recv}$, $KB3_{recv}$, $\Delta t1$, $\Delta t2$, and $\Delta t3$;
instructions for calculating a least-squares-error fit of BWsend, BWrecv and LATENCY to the linear modeling equation of
$\Delta t = (KB_{send}/BW_{send}) + (KB_{recv}/BW_{recv}) + LATENCY$, wherein $BW_{send}$ indicates available connection bandwidth from the first system to the second system, $BW_{recv}$ indicates available connection bandwidth from the second system to the first system, and LATENCY is the delay time of a zero-byte message sent from the first system to the second system and back to the first system; and
instructions for storing $BW_{send}$, $BW_{recv}$, and LATENCY in a computer-readable medium.

14. The computer program product of claim 13, further comprising
instructions for maintaining persistent state statistics relating to the first system and second system, by employing IIR filtering to keep the values bounded, to include at least one of
the sum of the number of message round-trips,
the sum of $\Delta t1$, $\Delta t2$, and $\Delta t3$,
the sum of $KB1_{send}$, $KB2_{send}$, and $KB3_{send}$,
the sum of $KB1_{recv}$, $KB2_{recv}$, and $KB2_{recv}$,
the sum of $\Delta t1^2$, $\Delta t2^2$, and $\Delta t3^2$,
the sum of $KB1_{send}^2$, $KB2_{send}^2$, and $KB3_{send}^2$,
the sum of $KB1_{recv}^2$, $KB2_{recv}^2$, and $KB3_{recv}^2$,
the sum of $KB1_{send}*KB1_{recv}$, $KB2_{send}*KB2_{recv}$, and $KB3_{send}*KB3_{recv}$,
the sum of $\Delta t1*KB1_{recv}$, $\Delta t2*KB2_{recv}$, and $\Delta t3*KB3_{recv}$, and
the sum of $\Delta t1*KB1_{send}$, $\Delta t2*KB2_{send}$, and $\Delta t3*KB3_{send}$.

15. The computer program product of claim 13, wherein $\Delta t$, KBsend and KBrecv are calculated using decayed values from previous values stored in an IIR filter.

16. A method for efficient data transfer between a client system and a mirror system, comprising:
identifying a plurality of mirror systems, each of which stores at least some common data;
determining a closest mirror system, from the plurality of mirror systems, that has the highest-bandwidth connection with the client system; and
transferring a data file between the client system and the closest mirror system,
wherein the determining step comprises, for each of the plurality of mirror systems:
loading a set of data, the data including
$KB1_{send}$, $KB2_{send}$, and $KB3_{send}$, which represent the respective sizes of a series of probe messages from the client system to the mirror system,
$KB1_{recv}$, $KB2_{recv}$, and $KB3_{recv}$, which represent the respective sizes of a series of probe messages from the mirror system to the client system, wherein $KB1_{send}$ is approximately equal to $KB1_{recv}$, $KB2_{send}$ is greater than to $KB2_{recv}$, and $KB3_{send}$ is less than $KB3_{recv}$, and
$\Delta t1$, $\Delta t2$, and $\Delta t3$, which represent the round-trip times of a series of probe messages sent from the client system to the mirror system and back to the client system;
calculating values $\Delta t$, KBsend and KBrecv from $KB1_{send}$, $KB2_{send}$, $KB3_{send}$, $KB1_{recv}$, $KB2_{recv}$, $KB3_{recv}$, $\Delta t1$, $\Delta t2$, and $\Delta t3$;
calculating a least-squares-error fit of BWsend, BWrecv and LATENCY to the linear modeling equation of
$\Delta t = (KB_{send}/BW_{send}) + (KB_{recv}/BW_{recv}) + LATENCY$, wherein $BW_{send}$ indicates available connection bandwidth from the client system to the mirror system, $BW_{recv}$ indicates available connection bandwidth from the mirror system to the client system, and LATENCY is the delay time of a zero-byte message sent from the client system to the mirror system and back to the client system, and
storing $BW_{send}$, $BW_{recv}$, and LATENCY in a computer-readable medium.

* * * * *

UNITED STATES PATENT AND TRADEMARK OFFICE
CERTIFICATE OF CORRECTION

PATENT NO.        : 6,865,510 B2  
APPLICATION NO.   : 10/318291  
DATED             : March 8, 2005  
INVENTOR(S)       : Michael R. Engbrecht It is certified that error appears in the above-identified patent and that said Letters Patent is hereby corrected as shown below:

Column 10, claim 1, line 11, delete "KBrecv" and replace with --$KB_{recv}$--;
Column 10, claim 4, line 42, delete "KBsend" and replace with --$KB_{send}$--;
Column 10, claim 4, line 43, delete "KBrecv" and replace with --$KB_{recv}$--;
Column 11, claim 8, line 1, delete "KBsend" and replace with --$KB_{send}$--;
Column 11, claim 8, line 1, delete "KBrecv" and replace with --$KB_{recv}$--;
Column 11, claim 8, line 4, delete "BWsend" and replace with --$BW_{send}$--;
Column 11, claim 8, line 4, delete "BWrecv" and replace with --$BW_{recv}$--;
Column 11, claim 10, line 31, delete "KBsend" and replace with --$KB_{send}$--;
Column 11, claim 10, line 32, delete "KBrecv" and replace with --$KB_{recv}$--;
Column 11, claim 13, line 56, delete "KBsend" and replace with --$KB_{send}$--;
Column 11, claim 13, line 57, delete "KBrecv" and replace with --$KB_{recv}$--;
Column 11, claim 13, line 60, delete "BWsend" and replace with --$BW_{send}$--;
Column 11, claim 13, line 60, delete "BWrecv" and replace with --$BW_{recv}$--;
Column 12, claim 15, line 24, delete "KBsend" and replace with --$KB_{send}$--;
Column 12, claim 15, line 24, delete "KBrecv" and replace with --$KB_{recv}$--;
Column 12, claim 16, line 49, delete "KBsend" and replace with --$KB_{send}$--;
Column 12, claim 16, line 49, delete "KBrecv" and replace with --$KB_{recv}$--;
Column 12, claim 16, line 52, delete "BWsend" and replace with --$BW_{send}$--;
Column 12, claim 16, line 53, delete "BWrecv" and replace with --$BW_{recv}$--.

Signed and Sealed this

Ninth Day of January, 2007

JON W. DUDAS  
*Director of the United States Patent and Trademark Office*